3,130,237
PROCESS FOR HYDROGENATING
ORGANIC COMPOUNDS
Milton M. Wald, Walnut Creek, Calif., assignor to Shell Oil Company, New York, N.Y., a corporation of Delaware
No Drawing. Filed Mar. 29, 1961, Ser. No. 99,031
10 Claims. (Cl. 260—638)

This invention relates to a novel process for the hydrogenation of hydrogenatable organic compounds. More particulesly, it relates to a homogeneous catalytic process for the hydrogenation of organic compounds of various types. Specifically, the process is characterized by the use of cobalt complexes of compounds including organo phosphines and organo arsines.

A principal object of the present invention is to provide an improved method for hydrogenating organic compounds by means of stable homogeneous hydrogenation catalysts. Another object is to provide an improved hydrogenation process wherein the aforesaid cobalt complexes function as homogeneous catalysts. Further objects and features of advantage will be apparent from a consideration of the following detailed description of the invention.

In accordance with the present invention, hydrogenatable organic compounds are hydrogenated by intimately contacting the same with hydrogen under conditions of temperature, pressure, etc. sufficient to effect such hydrogenation reaction in the presence of a complex of cobalt and certain organo compounds formed from elements in the trivalent state from group V$a$ of the Periodic Chart of the Elements as published by Fisher Scientific Company (1957) having an atomic number of from 15 through 33 inclusive. Such organo compounds may be phosphines, arsines, or mixtures thereof. Other characteristics and descriptive features of the particular catalytic materials suitable for use in the process of the invention will be more clearly set forth in the detailed description hereinafter.

The process of the present invention involves homogeneous catalysis. Such catalytic reactions require the presence of a homogeneous hydrogenation catalyst, by which is meant one which is dissolved in a liquid phase along with the hydrogenatable organic compound. The hydrogenation catalysts known in the art which have in the past proven to be of more than academic interest have largely been heterogeneous catalysts. Such genera exist in a phase separate from the material whose reaction is to be catalyzed.

It is, therefore, a feature of advantage of the present invention that hydrogenation may be accomplished by catalytic means in a single-phase reaction mass whereby a uniform molecular dispersion is present; such is not the case with heterogeneous catalysis. Such uniform molecular dispersion provides an inherent advantage of high selectivity for the production of desired end products in view of the fact that all of the catalytic sites are substantially similar and equivalent. Moreover, a reaction involving homogeneous catalysis also affords a maximum amount of catalyst available in a given reaction and it suffers less from catalyst poisoning. A further advantage of such a homogeneous reaction system is in the fact that the reactive sites are not made unavailable or shielded from the reactants during hydrogenation, as for example, by coke deposition, which thereby may physically deactivate the catalyst to a considerable degree.

The term "complex," as used herein, indicates a coordination compound which is a combination of a metal atom with one or more electronically-rich molecules or atoms capable of independent existence.

Besides being a very efficient catalyst for the hydrogenation reaction, a still further and important feature of advantage in the cobalt complexes described herein as homogeneous catalysts is their great stability. Catalyst stability refers to the ability of a catalyst to remain in its most active form throughout the reaction in which it is employed. On the other hand, instability is evidenced by a dissociation of a catalytic material accomplished by precipitation of the metal. While the art teaches to a limited degree the use of other complex hydrogenation catalysts, such materials have generally been found to be rather unstable. Accordingly, it is of primary importance to use these novel complexes in an improved hydrogenation process, taking advantage of their stability whereby either high or low hydrogen pressure as well as relatively high temperature, as found most convenient and desirable, can now be used.

The cobalt complex catalytic material of the invention may be represented by the general formula $$H_nCo(CO)_z(ER_3)_x(E_2R'_5)_y$$

wherein $n$ may be either 0 or 1 as the oxidation state of the cobalt is correspondingly varied, $x$ and $z$ may be any whole number from 0 to 3, inclusive, and $y$ may be any whole number from 0 to 2, inclusive, with the equation $x+2y+z=4$ to be satisfied. In the general formula, E represents an element in its trivalent state and having an atomic number of 15 or 33, to wit, phosphorus or arsenic. Moreover, R and R', respectively, may be hydrogen, a hydrocarbyl group, or a halogenated or alkoxy substituted hydrocarbyl group. It is a further requirement that at least one R' must be other than hydrogen, for example, either a hydrocarbyl or a halogenated hydrocarbyl group. Although R and R' may contain over ten carbon atoms and vary in structure over a considerable range, it is preferred that they be alkyl or aryl radicals of up to eight carbon atoms, since the rate of complex formation with these radicals is more rapid. Straight- and branched-chain alkyl radicals are equally suitable. Halogenated hydrocarbons have also been found to function satisfactorily over wide ranges of substituents. It will be apparent to those skilled in the art that the number of complexes suitable for use as catalytically active materials in the process of the invention is of considerable magnitude. The following list of representative materials from which such complexes can be prepared is offered for purposes of illustration but the invention is not to be limited to those particular species.

$(C_2H_5)_3P$; $(C_2H_5)_2PC_6H_5$; $(C_2H_5)P(C_6H_5)_2$;
$(C_6H_5)_3P$; $(C_4H_9)_3P$; $C_6H_5P(n-C_4H_9)_2$; $(C_6H_5)_2PCH_3$;
$(C_6H_5)_2PH$; $(C_6H_5)_2PCH_2CH_2P(C_6H_5)_2$;
$(C_6H_5)_2PCH_2CH_2CH_2CH_2P(C_6H_5)_2$;
$(C_6H_5)_2PCH_2CHCH_3P(C_6H_5)_2$;
$(C_6H_5)_2PCH_2CH_2CH_2CH_2P(C_6H_5)_2$;
$(p-CH_3OC_6H_4)_3P$; $(i-C_3H_7)_3P$; $C_6H_5P(i-C_3H_7)_2$;
$(C_2H_5)_3As$; $(C_6H_5)_3As$; $(n-C_4H_9)_3As$; $(i-C_3H_7)_3As$;
$(C_6H_5)_2AsCH_2CH_2As(C_6H_5)_2$; $C_6H_5As(C_2H_5)_2$;
$(C_6H_5)_2P(n-C_4H_9)$; $(ClCH_2CH_2)_3P$

The complexes to be used in the process of the invention may be prepared, for example, by intermixing a cobalt salt with a suitable solvent in the presence of the trivalent phosphorus or arsenic compound and carbon monoxide, as required, and hydrogenating the solution. The particular complex to be formed will, in a large part, depend upon the selection and usage of a correspondingly appropriate trivalent phosphorus or arsenic compound. These are then combined under the following conditions to prepare the catalytically active materials for use in the process of the invention.

The pressure and temperature of the system may vary over a relatively wide range, depending upon the particular reactants and the product desired. The arsine or phosphine used in the synthesis of the cobalt complex will, of course, be an important factor in governing the selection of appropriate synthesis conditions. It has been found that a temperature of from about 50° C. to about 200° C. has been successful with a variety of reactants. A hydrogen pressure of from about less than one atmosphere to about 100 atmospheres may suitably be employed within the temperature range. It is generally preferable to carry out the synthesis at about 125° C. under about 1 to about 10 atmospheres of hydrogen.

While any soluble cobalt salt generally is suitable, either of an inorganic or an organic acid, the degree of solubility is not particularly critical and salts which are only slightly soluble may often be used to advantage. The salts of strong, non-oxidizing inorganic acids, such as of the hydrohalic acids, salts of weak non-oxidizing inorganic acids, such as HCN, and salts of such organic acids as carboxylic acids, may be used. Examples of preferred salts are chlorides, bromides, cyanides, acetates, propionates, butyrates, and the like. Hydrated salts have been found to be equally useful. Although salts of the foregoing monobasic acids are preferred, salts of polybasic acids, such as sulfuric, the sulfonic acids, phosphoric and the phosphonic acids may also be used.

A particularly convenient method for preparing the catalytic materials of the present invention is by reacting dicobalt octacarbonyl [$Co_2(C)_8$] with the appropriate phosphine or arsine.

The complexes may be prepared from any mole ratio of the starting materials that will result in an appreciable amount of complex formation. A stoichiometric excess of the phosphorus or arsenic compound over the cobalt salt will in general produce the desired results and may be preferred, although smaller proportions of the phosphorus or arsenic compound may be used if desired. Mole rations of the group $Va$ element to cobalt from 1:1 to over 10:1 may be used with good results. Larger concentrations of the cobalt have the effect of causing an increase in the rate of hydrogen uptake by the solution.

The invention is generally applicable to the hydrogenation of any organic compound capable of being hydrogenated with hydrogen in the presence of a catalyst. Thus, the invention is suitable for adding hydrogen to carbon-to-carbon unsaturated linkages of unsaturated aliphatic, cycloaliphatic and aromatic compounds, such as, for example, alpha-methylstyrene. It is also applicable to reduce the oxidation state of functional groups present in aliphatic, cycloaliphatic, and aromatic compounds. It is possible to achieve both of the foregoing simultaneously if the particular organic compound contains both carbon-to-carbon unsaturation and a reducible functional group. In a compound of this latter type, it is also possible to selectively hydrogenate the functional group or carbon-to-carbon unsaturation by appropriate choice of generally milder reaction conditions.

The invention is used to advantage in the hydrogenation of carbon-to-carbon unsaturated linkages in hydrocarbons. The unsaturation may be ethylenic as in the monoolefins such as ethylene, propylene, and butylene, or acetylenic as in the monoalkynes such as acetylene and 3-pentyne. It is possible to saturate branched- and straight-chain acyclic hydrocarbon compounds having one or more of these ethylenic and/or acetylenic sites. These sites may be conjugated as in 1,3-butadiene or non-conjugated as in 1,5-hexadiene. The unsaturated carbon-to-carbon linkages may be between terminal and their adjacent carbon atoms, as in 1-pentene, or between two internal chain carbon atoms, as in 4-octene.

Macromolecular materials involving acyclic units of the above types such as polyolefins like polyethylene, polybutadiene, polyisoprene as well as copolymers of olefins like the ethylene-propylene copolymers and butadiene-styrene copolymers are also within the scope of applicability of this invention.

Hydrocarbon cyclic compounds are equally suitable for use in this invention. This group includes the unsaturated alicyclic hydrocarbons such as the cyclic olefins containing carbon-to-carbon unsaturation such as the cycloalkenes like cyclopentene, cyclohexene, or cycloheptene, having one or more unsaturated sites. Also included in this category are the terpenes and fused-ring polycyclic olefins such as 2,5-bicyclo(2.2.1)-heptadiene, 1,4,4a,5,8,8a-hexahydro-1,4,5,8-dimethanonaphthalene and the like.

Compounds having combinations of both acyclic and cyclic carbon-to-carbon unsaturated sites of the foregoing types may have their degree of unsaturation reduced or be completely saturated by the process of this invention.

It has been found that with the catalytic material of the present invention the hydrogenation of an aromatic ring structure occurs less rapidly than the hydrogenation of other unsaturated organic compounds. Thus, a complex comprising cobalt, carbon monoxide and tributylarsine is a catalyst with improved selectivity over those taught in the prior art. For example, this catalytic material catalyzes the quantitative conversion of alpha-methylstyrene to cumene whereas a conventional nickel metal hydrogenation catalyst, such as Raney nickel or Girdler nickel, used under similar conditions causes considerable ring hydrogenation (to isopropylcyclohexane).

The process of this invention may also be used to hydrogenate unsaturated carbon-to-carbon linkages of non-hydrocarbons without reducing any functional groups present. Thus, it is possible to hydrogenate unsaturated alcohols, aldehydes, and acids to corresponding alcohols, aldehydes, and acids containing a lesser degree of carbon-to-carbon unsaturation or to corresponding saturated analogs. The carbon-to-carbon unsaturation may be present in a cyclic, acyclic, or heterocyclic molecule. For example, hydrogenation of acrolein would produce propionaldehyde, hydrogenation of allyl alcohol would produce n-propyl alcohol, hydrogenation of acrylic acid would produce propionic acid, hydrogenation of propargyl alcohol may produce allyl alcohol and/or n-propyl alcohol, and hydrogenation of 1-hydroxy-2,4-pentadiene may produce 1-hydroxy-2-pentene and/or 1-pentanol. Similarly, unsaturated amines, esters, and other types of compounds may be hydrogenated to reduce the degree of unsaturation. For example, hydrogenation of allyl acrylate or allyl amine would produce propyl acrylate and propyl amine, respectively. Moreover, unsaturated sulfones such as, for example, sulfolene, may be hydrogenated by the process of the present invention to form the corresponding sulfone, in this case, sulfolane, without modifying the sulfone group present.

In the same manner, alicyclic compounds similar in structure to the cyclic hydrocarbon previously discussed but which also have functional groups containing oxygen, nitrogen, or sulfur, may have their carbon-to-carbon unsaturaton reduced as in the pure hydrocarbon but without reducing any functional group or groups present. Examples of alicyclic compounds are cyclohexenyl alcohol, cyclopentenyl amine, and methyl cyclobutenyl thioate.

Moreover, certain other organic compounds containing hydrogenatable functional groups may be hydrogenated by the process of this invention to reduce the oxidation state of the functional groups. As previously mentioned, such functional groups sometimes may be selectively reduced in the presence of carbon-to-carbon unsaturation or even concurrently reduced while the carbon-to-carbon linkage is saturated. An example of hydrogenation for the purpose of reducing the oxidation state of functional groups would be the reduction of aldehydes and ketones to alcohols.

Specific examples of a few of the types of hydrogenatable organic compounds that may be hydrogenated in accordance with the invention and the products obtained include the following.

Addition of hydrogen to unsaturated linkages of aliphatic and cycloaliphatic hydrocarbons:

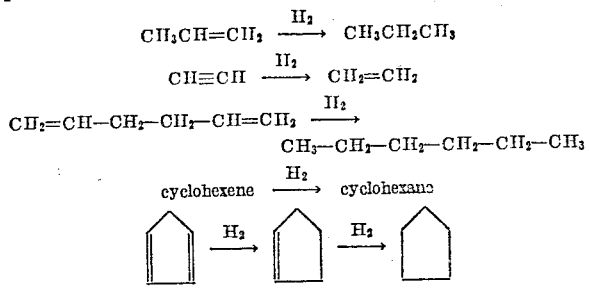

Reduction of functional groups:

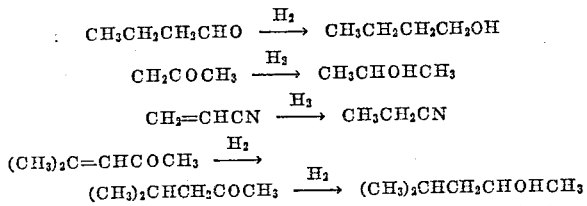

The process of this invention is carried out by hydrogenating the hydrogenatable organic compound in liquid phase at hydrogenation pressure and temperature. The precise hydrogen pressure used in the invention may accordingly be selected from over a considerable range. However, due to the unusually superior activity of the catalysts, it is possible to carry out the hydrogenation reaction at relatively low pressures. Pressures of hydrogen as low as 5 p.s.i.a. or less have been found to produce good yields. Although very high pressure may also be employed when desired, it is preferred to use pressures between about 5 p.s.i.a. and about 1500 p.s.i.a.; with 500–1000 p.s.i.a. being especially convenient and advantageous.

Reaction temperatures, likewise, may be varied readily to any convenient point with equally successful results. Possible decomposition of the compound to be hydrogenated, the heat stability of the catalytic complex, and the attainment of reasonably rapid reaction rates are important factors to be considered in determining the temperature to be used. Generally, temperatures between about 50° C. and 300° C. will prove satisfactory, although temperatures between about 100° C. and 200° C. are preferred.

Ratios of catalyst to the compound to be hydrogenated are not particularly critical and may be varied in order to achieve a homogeneous solution. Solvents are therefore generally not required although inert solvents such as saturated hydrocarbons and ethers may be used if desired. In general, larger quantities of catalyst will produce a faster reaction. Ratios of catalyst to reactant between 1:500 and 10:1 will normally accomplish the desired effect. When the reaction has gone to completion, the hydrogenated compound may be removed from the reaction mixture by any suitable means, such as by distillation. The following examples illustrate details of procedures which may be followed. It is to be understood that these examples are given only for the purpose of illustration and are not to be construed as limiting the invention in any way.

*Example I*

Cobalt acetate (5 millimoles), phenyldiethylphosphine (5 ml.), and diphenyl ether (10 ml.) were placed in a 100-ml. stainless steel reactor which was then flushed with hydrogen and pressured to 600 p.s.i.g. with a 2:1 mixture of hydrogen and carbon monoxide and the resulting mass heated to 150° C. Reduction occurred just before the temperature reached 150° C., as shown by a rapid pressure drop at this time. The reactor was cooled, the gas vented, and 5 ml. of alpha-methylstyrene introduced. Hydrogenation was then attempted at 150° C. and 800 p.s.i.g. $H_2$. A rapid uptake of hydrogen occurred (80 p.s.i./min.) until one mole of hydrogen had been adsorbed for each mole of alpha-methylstyrene used, at which time the adsorption of gas ceased. Another charge of alpha-methylstyrene was introduced and hydrogenated with similar results. Analysis of the product showed cumene to be present in 95% yield. 3-Sulfolene (4.9 g.) was introduced and hydrogenated at 80° C. and 765 p.s.i.g. $H_2$. Hydrogen uptake (170 p.s.i./hr.) occurred. Analysis showed that the major product was sulfolane.

*Example II*

0.85 gram dicobalt octacarbonyl, 5 ml. tributylarsine and 10 ml. diphenyl ether were placed in a 100 ml. stainless steel reactor which was then pressured to 100 p.s.i.g. $H_2$ and heated at 100° C. for 30 minutes. An infrared spectrum of the solution showed that no dicobalt octacarbonyl or hydrocarbonyl) was present but that a new complex containing carbon monoxide was present. Three successive charges of alpha-methylstyrene were introduced and hydrogenated at 100° C. and 775 p.s.i.g. $H_2$. The rate of hydrogen uptake was about 200 p.s.i./min. and in each case reaction stopped after one mole of hydrogen was taken up per mole of alpha-methylstyrene used.

*Example III*

5 millimoles cobalt acetate, 8.0 grams (20 millimoles) 1,2-bis(diphenylphosphino)ethane, and 10 ml. diphenyl ether were placed in the reactor, flushed with hydrogen, heated to 100° C. and pressured to 106 p.s.i.g. with hydrogen. The pressure dropped 36 p.s.i.g. (corresponding to 7.8 millimoles) and levelled off. The mass was cooled, vented, and pressured to 210 p.s.i.g. with ethylene, heated to 250° C., and then to a total 830 p.s.i.g. with hydrogen. A pressure drop of 130 p.s.i./min. ensued. Analysis showed that ethane was the product. A charge of 5 ml. alpha-methylstyrene was introduced and hydrogenated at 250° C. and 830 p.s.i.g. $H_2$. The rate of hydrogen uptake was 160 p.s.i./min. and analysis showed that cumene was produced in quantitative yield.

*Example IV*

2.5 millimoles dicobalt octacarbonyl, 5 millimoles 1,4-bis(diphenylphosphino)butane and 13 ml. diphenyl ether were placed in the reactor, flushed with hydrogen, and heated for 30 minutes at 100° C. under 100 p.s.i.g. $H_2$. A charge of 5 ml. alpha-methylstyrene was introduced and hydrogenated at 150° C. and 790 p.s.i.g. $H_2$. The rate of hydrogen uptake was 70 p.s.i./minute, and the reaction stopped when one mole of hydrogen per mole of olefin used was taken up.

*Example V*

2.5 millimoles dicobalt octacarbonyl, 5.0 millimoles 1,2-bis(diphenylphosphino)ethane and 23 ml. diphenyl ether were placed in a glass reactor and heated at 150° C. for 30 minutes under an atmosphere of carbon monoxide. The mixture was cooled and 30 millimoles triphenylarsine was added. The mixture was heated at 150° C. for one hour with nitrogen gas bubbling through the solution. The product was transferred to a steel reactor and several charges of 5 ml. alpha-methylstyrene were hydrogenated at 750 p.s.i.g. $H_2$. The rate of hydrogen uptake was 18 p.s.i./minute at 125° C. and 143 p.s.i./minute at 150° C. A charge of 5 ml. diisobutylene was then introduced and hydrogenated at 150° C. and 700 p.s.i.g. $H_2$. Analysis showed that isooctane was the product.

The following table is illustrative of the products obtained from the catalyst containing the indicated ligands and the substrates listed opposite therein, along with the method used:

| Ligand | Substrate | Method Used—Refer Preceding Example No. | Major Product |
|---|---|---|---|
| Ethyldiphenylphosphine | Alpha-methylstyrene | II | Cumene. Rate unaffected by presence of n-dibutyl sulfide. |
| Do | n-Butyraldehyde | II | n-Butanol. |
| Diphenylphosphine | Alpha-methylstyrene | II | Cumene. |
| Triisopropylphosphine | do | II | Do. |
| Ethyldiphenylphosphine | Cyclohexene | II | Cyclohexane. |
| Do | Acrylonitrile | II | Ethyl cyanide. |
| Do | Acetone | II | Isopropyl alcohol. |
| Do | Piperylene and cyclopentadiene | II | Pentene and cyclopentene. |
| 1,5-bis(diphenylphosphino)pentane | Alpha-methylstyrene | II | Cumene. |
| 1,4-bis(diphenylphosphino)butane | do | II | Do. |
| Triphenylphosphine | do | II | Do. |
| Triethylarsine | do | II | Do. |
| Tributylphosphine | do | I | Do. |
| 1,2-bis(diphenylphosphino)ethane+triphenylphosphine | do | V | Do. |
| Ethyldiphenylphosphine | Alpha-methylstyrene (dodecane solvent) | II | Do. |
| Do | Pentene-1 | II | n-Pentane. |
| Phenyldiethylarsine | Alpha-methylstyrene | II | Cumene. |
| Tris(para-methoxyphenyl)phosphine | do | II | Do. |
| 1,4-bis(diphenylphosphino)butane | Alpha-methylstyrene | III | Do. |
| 1,2-bis(diphenylphosphino)ethane | Mesityl oxide | III | Methylisobutyl ketone. |
| Tri-n-butylphosphine | Quinoline | I | Tetrahydroquinoline. |
| Ethyldiphenylphosphine | Anthracene | II | Dihydroanthracene. |

The reactor used was a 100 ml. stainless steel autoclave connected to a 15 to 1000 p.s.i.a. transducer and to sources of hydrogen and vacuum. The volume of these external fittings was kept to a minimum to provide the maximum sensitivity of pressure to the change in number of millimoles of hydrogen present. The catalyst and compound to be hydrogenated were charged to the reactor, a coated magnetic stirring bar was added, and the reactor was closed, evacuated and pressured with hydrogen until all foreign gases were displaced. The reactor was then heated under vacuum. After the temperature reached the desired point, the $H_2$ pressure was increased to the designated run pressure and the pressure reduction was recorded. If a large amount of hydrogen was absorbed, the reactor was repressured at suitable intervals.

The catalyst may be prepared separately and charged to the reactor along with the compound to be hydrogenated. Alternatively, the catalyst may be first prepared in the above-described equipment, at which time the compound to be hydrogenated is added to the solution in the same equipment. This latter procedure was used in the examples to follow and is a convenient procedure. A small quantity of a base such as sodium acetate may be added to the reaction mixture to neutralize acidity produced by salts in the mixture.

It is also possible to add the reactants necessary for the preparation of the catalyst to the reactor at the same time that the compound to be dehydrogenated is added. During hydrogenation, the catalyst will be formed in situ and will then catalyze the hydrogenation of the added organic compound.

I claim as my invention:

1. In a process for hydrogenating a hydrogenatable compound of the group consisting of ethylenic hydrocarbons, acetylenic hydrocarbons, aldehydes and ketones by reaction in the liquid phase with hydrogen in the presence of a hydrogenation catalyst, the improvement of carrying out said hydrogenation using a homogenous hydrogenation catalyst which is soluble in the liquid mixture and is a cobalt complex with a member of the group consisting of organo-phosphines and organo-arsines, said cobalt complex having the general formula

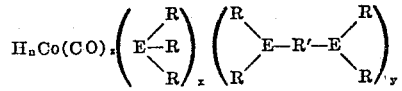

wherein $n$ may be any whole number from 0 to 1 inclusive, $x$ and $z$ may be any whole numbers from 0 to 3 inclusive, and $y$ may be any whole number from 0 to 2 inclusive with the equation $x+2y+z=4$ satisfied, where E is a member in its trivalent state of the group consisting of phosphorus and arsenic, wherein R is a member of the class consisting of hydrogen, alkyl of up to 8 carbon atoms, aryl hydrocarbon of up to 8 carbon atoms and halo and alkoxy substitution products of said alkyl and aryl, and R' is alkylene of up to 8 carbon atoms.

2. A process in accordance with claim 1 wherein a saturated aldehyde is hydrogenated.

3. Process in accordance with claim 1 wherein $n$ is equal to 0, $z$ is equal to 3, and wherein said

group is tributyl phosphine.

4. Process in accordance with claim 1 wherein $n$ is equal to 0, $z$ is equal to 3, and said

group is tributyl arsine.

5. Process in accordance with claim 1 wherein $n$ is equal to 0, $z$ is equal to 3, and wherein said

group is ethyldiphenylphosphine.

6. Process in accordance with claim 1 wherein $n$ is equal to 0, $y$ is equal to 1, $z$ is equal to 2, and wherein said

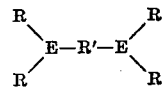

is 1,2-bis(diphenylphosphino)ethane.

7. Process in accordance with claim 1 wherein $n$ is equal to 0, $y$ is equal to 1, $z$ is equal to 2, and wherein said

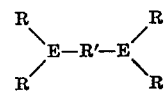

is 1,4-bis(diphenylphosphino)butane.

8. Process in accordance with claim 1 wherein $n$ is equal to 0, $y$ is equal to 2, and wherein said

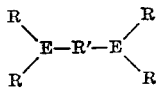

is 1,2-bis(diphenylphosphino)ethane.

9. Process in accordance with claim 1 wherein $n$ is equal to 0, $y$ is equal to 1, $x$ is equal to 2, and wherein said

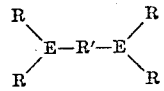

is 1,2-bis(diphenylphosphino)ethane and said $ER_3$ is triphenyl phosphine.

10. Process in accordance with claim 1 wherein $n$ is equal to 1, $y$ is equal to 1, $x$ is equal to 2, and wherein said

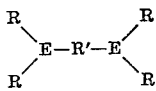

is 1,2-bis(diphenylphosphino)ethane and said $ER_3$ is triphenyl arsine.

References Cited in the file of this patent

UNITED STATES PATENTS

| | | |
|---|---|---|
| 2,542,417 | Kleinschmidt | Feb. 20, 1951 |
| 2,614,107 | Wender et al. | Oct. 14, 1952 |
| 2,840,617 | Shokal | June 24, 1958 |